3,637,822
PROCESS FOR PREPARING IMPROVED FURFURAL EXTRACTS

Calvin F. Rueping and Robert T. Daniel, Beaumont, Tex., assignors to Texaco Inc., New York, N.Y.
No Drawing. Filed Nov. 21, 1968, Ser. No. 777,905
Int. Cl. C07c 61/00
U.S. Cl. 260—514 N   8 Claims

ABSTRACT OF THE DISCLOSURE

A process for preparing neutralized and dehydrated furfural extracts having improved heat transfer properties.

---

This invention concerns the improvement of the properties of furfural extracts used as extender oil stocks.

More particularly, this invention relates to a multi-step treatment of neutralized high-wax content furfural extracts to effect an improvement in their heat-transfer properties.

The use of furfural extraction in petroleum refining is both widespread and advantageous, particularly in the production of lubricating and rubber extender oils. Furfural is an effective solvent for easily oxidized petroleum components and ineffective for many of the less readily oxidized components. In addition, the solvent offers the advantages of high density, low surface tension and relatively low volatility which favors rapid phase separation and relatively uncomplicated solvent recovery.

In the refining of paraffinic crude oils favored for the production of lubricants and rubber extender oils, it is usual to fractionate the high-wax content crude into what is referred to as wax or paraffin distillates. These distillates are then extracted with up to several times their volume of furfural using the usual countercurrent extraction techniques of the art. The solvent is stripped off leaving an acidic furfural extract material. These acidic extracts are then neutralized using an excess of strong aqueous solution of caustic to yield a relatively water-free, neutralized stock material which is especially rich in naphthenic type salts and can be blended with the usual additives to produce the desired rubber extender oil.

The above-described process is generally considered to be satisfactory for the production of lubricating oils and rubber extender oils, but it suffers from the substantial disadvantage of leaving the neutralized extract in an emulsion thickened form wherein the emulsion is probably derived from the naphthenic acid salts produced during neutralization. This emulsion tends to thicken the product particularly in cold weather to the point where loading and unloading operations are unduly time consuming and expensive. To overcome the handling problem, the neutralized extracts have been heated to try to reduce handling time but the extract has poor heat transfer characteristics and excessive heat-up time was required.

Recently it was discovered that neutralizing the acidic furfural extracts to a relatively narrow low acidity range followed by dehydrating the neutralized extracts to a predetermined water content produces smooth, fluid and bright extracts which have greatly improved viscosity and heat-transfer properties. As a result of this multi-step treatment the cost of heating the extracts and the time required to load and unload the material is greatly reduced. Inasmuch as these seemingly pedestrian steps result in the clarification of the extracts with a concomitant gain in fluidity and heat-transfer properties, the results are considered unusual.

In practice a furfural extract, previously derived from the fractionation of a paraffinic crude into paraffinic or wax distillates followed by extraction with furfural, is first neutralized between about 160° F.–180° F. with aqueous caustic to a neutralization number range between about 0.8 and 1.0, then dehydrated between 160° F. to about 250° F. until the water content is reduced below 500 p.p.m. water. The resultant dehydrated extracts are smooth, fluid and bright appearing and have substantially improved viscosity and heat transfer properties.

In the preferred practice the above-described acidic furfural extracts which have a neutralization number between about 1.5 and 2.0, and which are rich in aromatic content, are subjected to the multi-stage process comprising:

(1) neutralizing at 180° F. over a period of 8 to 14 hours with aqueous caustic to a neutralization number between about 0.8–1.0, then (2) heating the neutralized extracts to about 180–220° F. while passing a gas through the agitated extracts at a rate not to exceed 800 cubic feet per minute for a period not to exceed 30 hours to reduce the water content of the extracts below 500 p.p.m. and the SUS viscosity at 130° F. below about 800, then (3) terminating the passage of gas through the extracts, while reducing the temperature to between about 160–180° F. to remove possible entrained gases, and maintaining the agitated, dehydrated extracts in the absence of air and moisture to produce extracts having greatly improved heat-transfer properties.

The furfural extract product produced by this process is a bright, smooth, unemulsified fluid having the following characteristics:

water content—less than 500 p.p.m
neutralization number—between 0.8 to 1.0
naphthenic acid salt content—between 0.5 to 1.0% wt.
viscosity at 130° F. as measured by ASTM Procedure D–88—below 800 SUS
heat transfer time, as measured by the test described below—below 30 minutes

HEAT TRANSFER TEST FOR EXTENDER AND LUBRICATING OILS

This test measures the time required for an increase of 30° C. (54° F.) of an unagitated oil sample under constant conditions.

Two constant temperature baths are prepared. One bath temperature is set at 25±1° C. (77±2° F.) and the other at 60–62° C. (140–144° F.). A wide-mouth jar having a one-pint capacity is filled to 1.3 cm. (0.5 inch) from its top with the furfural extract to be tested. A thermometer ranging from 0–220° F. (20–110° C.) is placed through a cover extending to a distance of 6.7 cm. (2⅝ inches) from the top of the jar. The jar filled with sample is placed in the 25° C. (77° F.) bath and allowed to come to equilibrium with the bath. The jar containing sample is removed from the 25° C. (77° F.) bath and placed in the 60–62° C. (140–144° F.) bath in such a manner that all surfaces of the jar are in contact with the water. At this point the time required to obtain a 30° C. (54° F.) increase in the oil temperature is measured. A value of from 15 to 30 minutes is considered acceptable whereas a time of more than 30 minutes is unacceptable.

The dehydrating process described previously can be performed using any of the dehydration techniques known in the petroleum art. These include vacuum dehydration as well as the preferred "air-blowing" technique. When the latter procedure is used care must be taken to keep the flow of air between about 400 and 800 cubic feet per minute for no more than 30 hours in order to minimize possible adverse effects on viscosity and the neutralization number of the product. If desired, flue gas or inert gases such as nitrogen can be used instead of air.

To describe this invention in the greatest possible detail, the following examples showing the dehydration of the neutralized furfural extracts, their testing for moisture and heat transfer properties and the use of a dehydrated extract as an extender oil for synthetic rubber, are submitted.

Embodiment A

A blend of furfural extracts derived from fractionating a paraffinic crude to paraffin or wax distillates, followed by countercurrent extraction with furfural, is stripped of the furfural and stored for subsequent use. When these acidic extracts are neutralized with aqueous caustic to obtain a neutralization number below 1.0, the neutralized extracts have a water content of about 1500 p.p.m. and a viscosity of 130° F. of 1000 SUS. The time required for the neutralized extracts to increase 30° C. under the previously described conditions of the heat transfer test is 40 minutes or more, an unacceptable time for commercial usage.

EXAMPLE 1

The stripped furfural extract from Embodiment A is heated to 180° F. with stirring and neutralized to a neutralization number between 0.8 to 1.0. Then the neutralized extract is heated with agitation to 180–220° F. while blowing air through it at a rate of 800 cubic feet per minute. After a period of 24–30 hours the flow of air is discontinued and the temperature allowed to drop to between 160–180° F. to expedite release of entrained air. The extract appears smooth and bright. The following values are obtained:

| | |
|---|---|
| Viscosity, SUS at 130° F. | 791 |
| Neutralization No. ASTM D-974 | 0.90 |
| Water p.p.m. (SP-338) | 300 |
| Minutes required to increase 30° C. | 24.5 |

Subsequent actual unloading of the dehydrated extract confirmed that the superior heat transfer values and viscosity of the dehydrated product obtained in the laboratory are a qualitative indication of the unloading characteristics of the extract.

EXAMPLES 2–3

Using different acidic paraffinic crudes treated identically to that of Embodiment A, the following neutralized extracts are produced. The viscosity, heat transfer times and water values are shown before and after dehydration.

Example 2

(a) After neutralization but before dehydration

| | |
|---|---|
| Viscosity, SUS at 130° F. | 1113 |
| Water, p.p.m. | 1607 |
| Minutes required to increase 30° C. | (1) |

¹ Increase of 7° C. in 30 minutes.

(b) After neutralization and dehydration

| | |
|---|---|
| Viscosity, SUS at 130° F. | 791 |
| Water, p.p.m. | 285 |
| Minutes required to increase 30° C. | 24.5 |

Example 3

(a) After neutralization but before dehydration

| | |
|---|---|
| Viscosity, SUS at 130° F. | 1407 |
| Water, p.p.m. | 1700 |
| Minutes required to increase 30° C. | (1) |

¹ Increase of 4° C. in 30 minutes.

(b) After neutralization and dehydration

| | |
|---|---|
| Viscosity, SUS at 130° F. | 810 |
| Water, p.p.m. | 275 |
| Minutes required to increase 30° C. | 27.8 |

EXAMPLE 4

Utilization of extracts as rubber extenders

A thirty-five parts by weight portion of each of the dehydrated and neutralized furfural extracts prepared in Examples 1 to 3 is blended with a hundred parts by weight portion of a commercially obtained stripped GR–S in a Banbury mill. Each of the 3 batches has the following modifying additives blended in: five parts by weight of zinc oxide, two parts by weight sulfur, three parts by weight of zinc dimethyldithiocarbamate, two parts by weight of casein and one part by weight of N,N'-di-2-naphthyl-p-phenylenediamine. Each of the smooth homogenous batch blends are cured for 60 minutes to produce a utilizable oil extended rubber.

As the previous examples and discussions indicate, several advantages are gained by the practice of the inventive process including the improvement of viscosity and heat transfer properties of the furfural extracts. Not only is the time required for loading and unloading the material greatly reduced but less heating time is required during cold weather to produce an extract having suitable viscosity. An additional advantage is that the results are obtained without removing the sodium salt products of neutralization which are especially useful when the extracts are employed as an extender oil for rubber.

Various substitutions, changes and modifications can be made in the inventive process without departing from the inventive process. The metes and bounds of this invention are best determined by the preceding specification read in conjunction with the claims which follow.

What is claimed is:

1. A process for preparing furfural extracts having improved heat-transfer properties, said extracts being derived from fractionated and furfural extracted acidic paraffinic crudes, comprising the steps of:
  (a) contacting said furfural extracts over a period of 8 to 14 hours with aqueous caustic to a neutralization number of between 0.8 to 1.0;
  (b) heating said neutralized extracts between about 160° F. and 250° F. using dehydration techniques in addition to heating, to bring the water content below about 500 p.p.m. to produce a dehydrated extract having said improved heat-transfer properties.

2. The process of claim 1 wherein the neutralization is carried out with aqueous caustic at a temperature ranging from about 160 to 180° F.

3. The process of claim 2 wherein the dehydration is carried out by passing a gas through the extracts for between about 8 and 30 hours.

4. The process of claim 3 wherein the gas contains air.

5. The process for preparing furfural extracts having improved heat-transfer properties, said extracts being derived from the fractionation and furfural extraction of acidic paraffinic crudes, comprising the steps of:
  (a) adding aqueous caustic to the furfural extracts over a period of 8–14 hours while heating to a temperature between 160° F. and 180° F., until a hydrated extract having a neutralization number ranging between about 0.8–1.0 is obtained,
  (b) passing a gas through the neutralized hydrated extracts at a rate between 400 to 800 cubic feet per minute at a temperature between about 180° F. and 220° F. for a period not to exceed 30 hours, until a dehydrated neutralized extract having a water content below 500 p.p.m. of water and a viscosity at 130° F. of less than 800 SUS is obtained, then
  (c) terminating the passage of gas through the dehydration extracts until entrained gases are removed and maintaining said extracts having improved heat-transfer properties substantially free from gas and moisture.

6. The process of claim 5 wherein the gas contains air.

7. The process of claim 6 wherein the neutralization and dehydration steps are carried out while agitating the furfural extracts.

8. A neutralized and dehydrated furfural extract having improved heat-transfer properties, said extracts being derived from the fractionation and furfural extraction of acidic crudes produced by the steps comprising:
  (a) adding aqueous caustic to said furfural extracts over a period of 8–14 hours while heating to a temperature between 160° F. and 180° F., until a hydrated extract having a neutralization number ranging between about 0.8 and 1.0 is obtained;
  (b) passing a gas through the neutralized, hydrated, extracts at a rate between 400 and 800 cubic feet per minute at a temperature between about 180° F. and 220° F. for a period not to exceed 30 hours, until a dehydrated, neutralized extract having a water content below 500 p.p.m. and a viscosity at 130° F. of less than 800 SUS is obtained, then
  (c) terminating the passage of gas through the dehydrated extracts until entrained gases are removed and maintaining said extracts having improved heat-transfer properties substantially free from gas and moisture.

References Cited

UNITED STATES PATENTS

| | | | |
|---|---|---|---|
| 1,550,523 | 8/1925 | Eichwald | 260—514 |
| 3,133,960 | 5/1964 | Ewing et al. | 260—514 |

OTHER REFERENCES

Markley, Fatty Acids, part 2, pp. 739–744, 1961.

LORRAINE A. WEINBERGER, Primary Examiner

R. GERSTL, Assistant Examiner

U.S. Cl. X.R.

252—57